(12) United States Patent
Last

(10) Patent No.: US 10,391,915 B2
(45) Date of Patent: Aug. 27, 2019

(54) BREAKOVER RELEASE PIN

(71) Applicant: Textron Aviation Inc., Wichita, KS (US)

(72) Inventor: Brent William Last, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 41 days.

(21) Appl. No.: 15/910,339

(22) Filed: Mar. 2, 2018

(65) Prior Publication Data
US 2018/0251056 A1 Sep. 6, 2018

Related U.S. Application Data

(60) Provisional application No. 62/466,042, filed on Mar. 2, 2017.

(51) Int. Cl.
| | |
|---|---|
| *B60N 2/90* | (2018.01) |
| *B64D 11/06* | (2006.01) |
| *A47C 7/50* | (2006.01) |
| *B60N 2/02* | (2006.01) |

(52) U.S. Cl.
CPC ............ *B60N 2/929* (2018.02); *B60N 2/995* (2018.02); *B64D 11/0643* (2014.12); *A47C 7/506* (2013.01); *A47C 7/5062* (2018.08); *A47C 7/5066* (2018.08); *B60N 2002/0236* (2013.01)

(58) Field of Classification Search
CPC .... B64N 2/929; B64D 11/0643; B60N 2/995; A47C 7/506; A47C 7/5066; A47C 7/5062
USPC ................ 297/423.28, 423.26, 69, 70, 85 M
See application file for complete search history.

(56) References Cited

U.S. PATENT DOCUMENTS

| | | | | |
|---|---|---|---|---|
| 263,174 | A | * 8/1882 | Hartley | A47C 1/0345 297/69 |
| 1,900,653 | A | * 3/1933 | Marchisella | A47L 23/16 297/332 |
| 4,410,215 | A | * 10/1983 | McKean | B60N 2/995 297/423.19 |
| 4,819,987 | A | 4/1989 | Stringer | |
| 5,352,020 | A | 10/1994 | Wade et al. | |
| 6,196,631 | B1 | 3/2001 | Larson | |
| 6,669,143 | B1 | * 12/2003 | Johnson | B64D 11/06 244/118.6 |
| 7,338,132 | B2 | * 3/2008 | LaPointe | A47C 1/034 297/423.26 |
| 8,444,225 | B2 | * 5/2013 | Behe | B64D 11/06 297/330 |
| 8,708,417 | B2 | * 4/2014 | Mejuhas | B60N 2/62 297/423.26 |
| 8,725,281 | B2 | * 5/2014 | Iida | G11C 7/16 700/94 |
| 2014/0292052 | A1 | 10/2014 | Parker et al. | |

* cited by examiner

*Primary Examiner* — Syed A Islam
(74) *Attorney, Agent, or Firm* — Erise IP, P.A.

(57) ABSTRACT

A system and method are disclosed which prevent structural damage to a chair footrest in an aircraft. Aircraft typically include release pins which when pulled out of apertures at different angular positions on arms existing on each side of the seat frame enable a user to set the footrest at different angular positions. To avoid overloading, the pin has been included in a pivotable housing on an axle. Resistance against rotation of the pin is provided using a torsion spring. This enables the resistance to be set at a level that allows the pin to break out to prevent overloading.

16 Claims, 22 Drawing Sheets

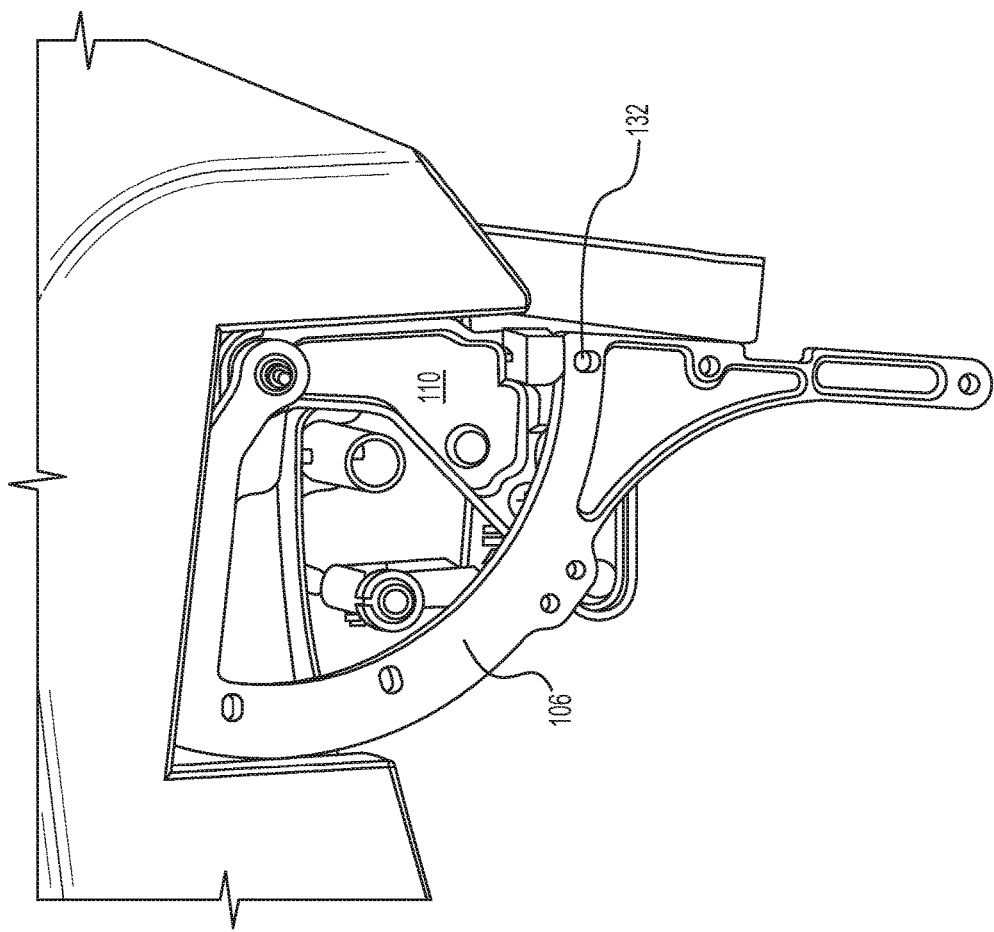

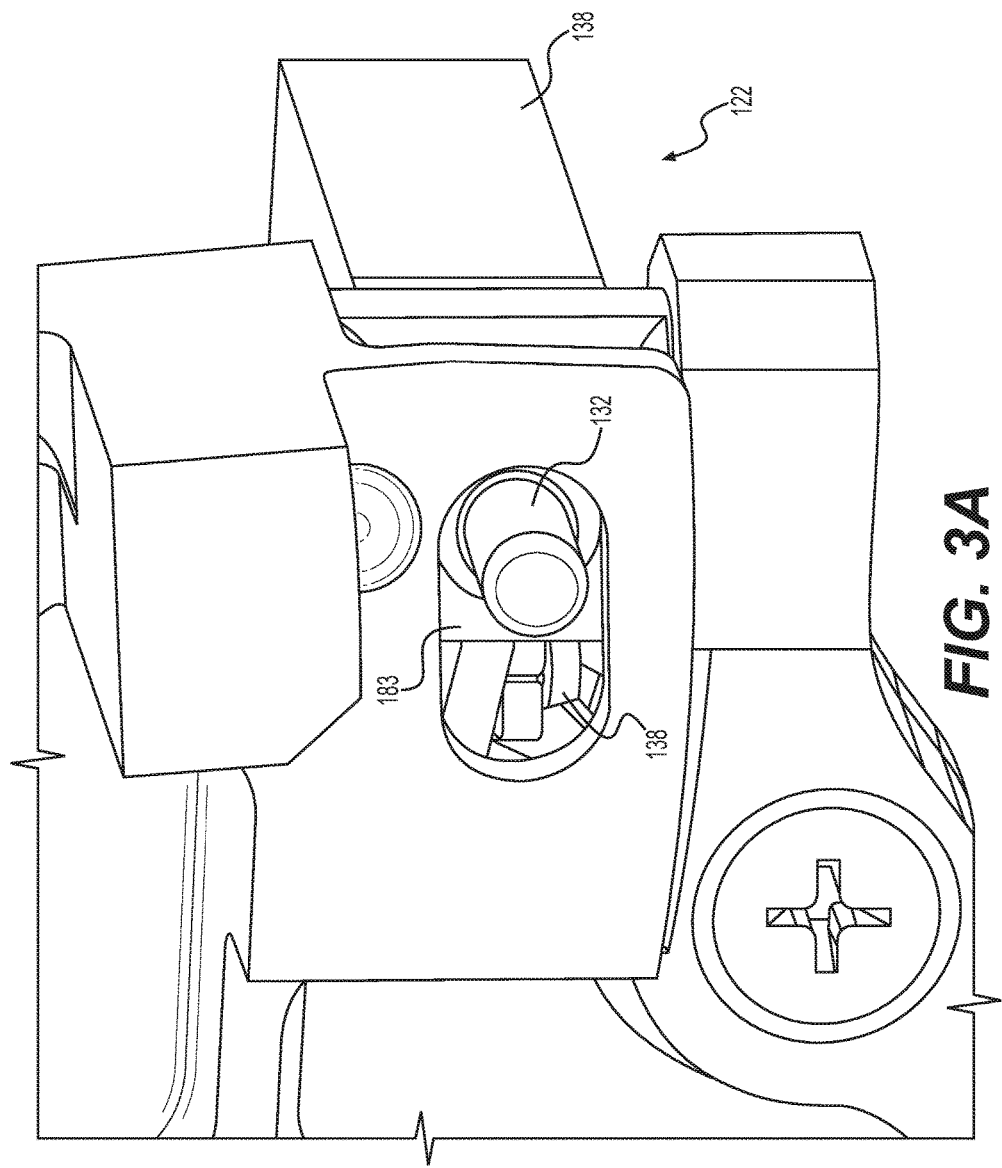

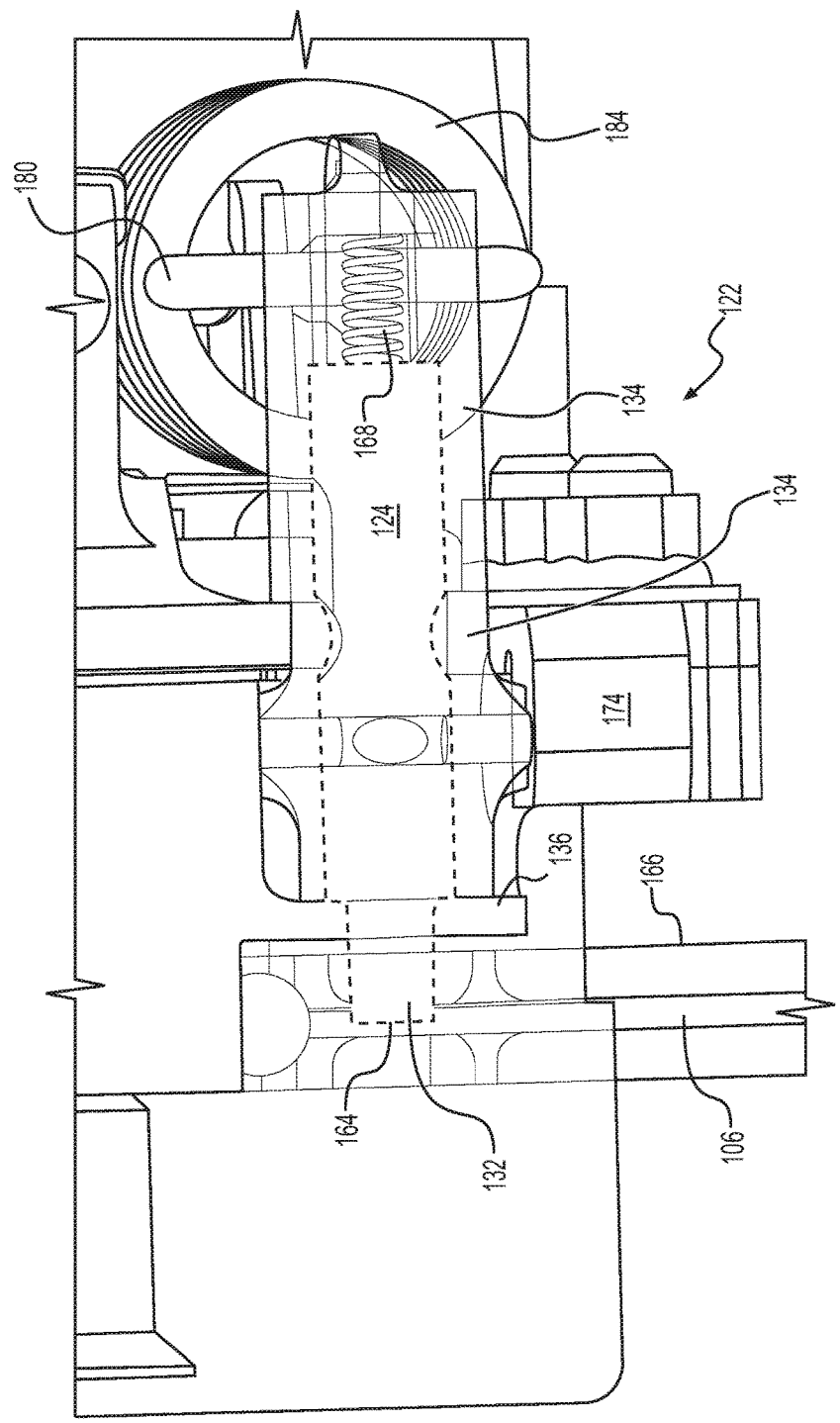

BREAKOVER RELEASE PIN

CROSS-REFERENCE TO RELATED APPLICATIONS

This application claims the benefit of U.S. Provisional Patent Application No. 62/466,042 filed Mar. 2, 2017, the entire contents of which are hereby incorporated by reference.

BACKGROUND OF THE INVENTION

1. Field

The disclosed embodiments relate generally to the field of aircraft seats. More specifically, the disclosed embodiments relate to avoiding structural damage due to overloading a footrest.

2. Description of the Related Art

Footrests have been implemented into various seats for a long time. Some of these devices operate using gas springs that are released using a pin that is extended or retracted using a push button or handle/lever arrangement. The user, with the underside of his or her calves resting on the footrest, positions the footrest in a variety as angular positions by allowing the gas springs to be released or compressed depending on pin action, as well as user pressure being applied or removed from the footrest.

If a passenger applies an abnormal amount of force to the footrest when it is extended (e.g., standing on it to reach an overhead bin, stepping on the footrest during a deplaning, etc.) there is a real possibility of damaging the structures and/or mechanical devices that comprise the footrest. Some prior art systems utilize hydraulic systems to control the footrest position, and incorporate a manual release pin that enables a user to disconnect in the event of a hydraulic malfunction.

SUMMARY

Disclosed embodiments include a system for use with a chair, e.g., having a footrest. In embodiments, the system includes a chair frame supporting a release pin assembly. The footrest is supported on a front portion of the chair frame on at least one pivotal member. In embodiments, the pivotal member has a plurality of angularly spaced apart apertures made there through, where each of the spaced apart apertures are adapted to receive a release pin. The apertures also serve to position the footrest in different angular positions. In embodiments, the release pin is retractable to enable removal from the apertures so that the pivotal member can be repositioned. To go to a new position, the release pin can be placed into another of said apertures and thus putting the footrest into a second angular position.

In yet further embodiments, the release pin is included in a housing that is subject to a break-over pivot. A resistance system can be provided to give resistance against rotation of the pin, but break out of the aperture when a predetermined load maximum has been reached. This prevents overloading of the pivotal member and possibly other structures.

In embodiments, the break-over pivot is created on an axle where one end of the axle is received into a first receptacle on the frame, and a second end of the axle is received into a second receptacle on the frame. The pin can be spring-loaded within the housing. The resistance system can include a tension spring which is secured between the frame and a back end of the housing. The tension spring, in embodiments, causes a portion of a front end of the housing to bear against an engaging face on the frame unless a force existing in the pivotal member exceeds the predetermined maximum.

The resistance system, in embodiments, is configured, upon an overcoming force being reached, to allow the pin housing to rotate about the axle thus causing the front of the pin housing to lift off of the engaging face on the frame and release the pin.

In embodiments, a symmetrical arrangement exists on an opposite side of the chair. The symmetrical arrangement can include a second resistance system which has a resistance to rotation equal to the resistance to rotation executed by the first resistance system.

The disclosed embodiments also include a breakover system for preventing structural damage to at least one mechanical component, the breakover system having (i) a pin on a frame; (ii) a weight-supporting member including at least one aperture, the aperture with receipt of the pin, causing the member to be in a first position; (iii) an overload-prevention system, the overload-prevention including a housing for the pin, the housing being subject to a pivot, and a resistance system providing resistance against rotation of the housing unless a predetermined load maximum has been reached; and (iv) the overload prevention system, once the load maximum has been reached, enables rotation of the pin housing in a direction such that the pin breaks out of the aperture such that the weight-supporting member is released.

The breakover system optionally incorporates: a spring which has been rated to allow for a release of the pin upon the reaching of the predetermined load maximum; two breakover systems being located on opposite sides of the footrest, each breakover system having dually-rated torsion springs.

A method embodiment is also disclosed for use in aircraft. The method includes: (i) providing a release pin in a system in the aircraft, the release pin being removable from an aperture in an arm mounted on a frame to allow for relative motion between the frame and arm, the arm being one of translatable or pivotal relative to the frame; (ii) including the release pin in a housing; (iii) making the housing pivotable relative to an axle secured at both ends to the frame; (iv) providing resistance against rotation of the pin about the axis; and (v) establishing the resistance at a level allowing the pin to break out of an aperture when a predetermined load maximum has been reached to prevent overloading of the arm.

In embodiments, a torsional force provides the resistance and the housing is configured to pivot relative to the frame such that a portion of a front end of the housing bears against an engaging face on the frame unless a force existing in the member exceeds the predetermined maximum.

BRIEF DESCRIPTION OF THE SEVERAL VIEWS OF THE DRAWINGS

Illustrative embodiments are described in detail below with reference to the attached drawing figures, which are incorporated by reference herein and wherein:

FIGS. 2A-C show details regarding the support members of disclosed embodiments;

FIGS. 3A-E show different perspective views of the pin housing and other structural components included in embodiments;

DETAILED DESCRIPTION

Embodiments provide systems and a method for preventing damage to the mechanical systems supporting a retractable footrest due to force overloads.

Figure 1:
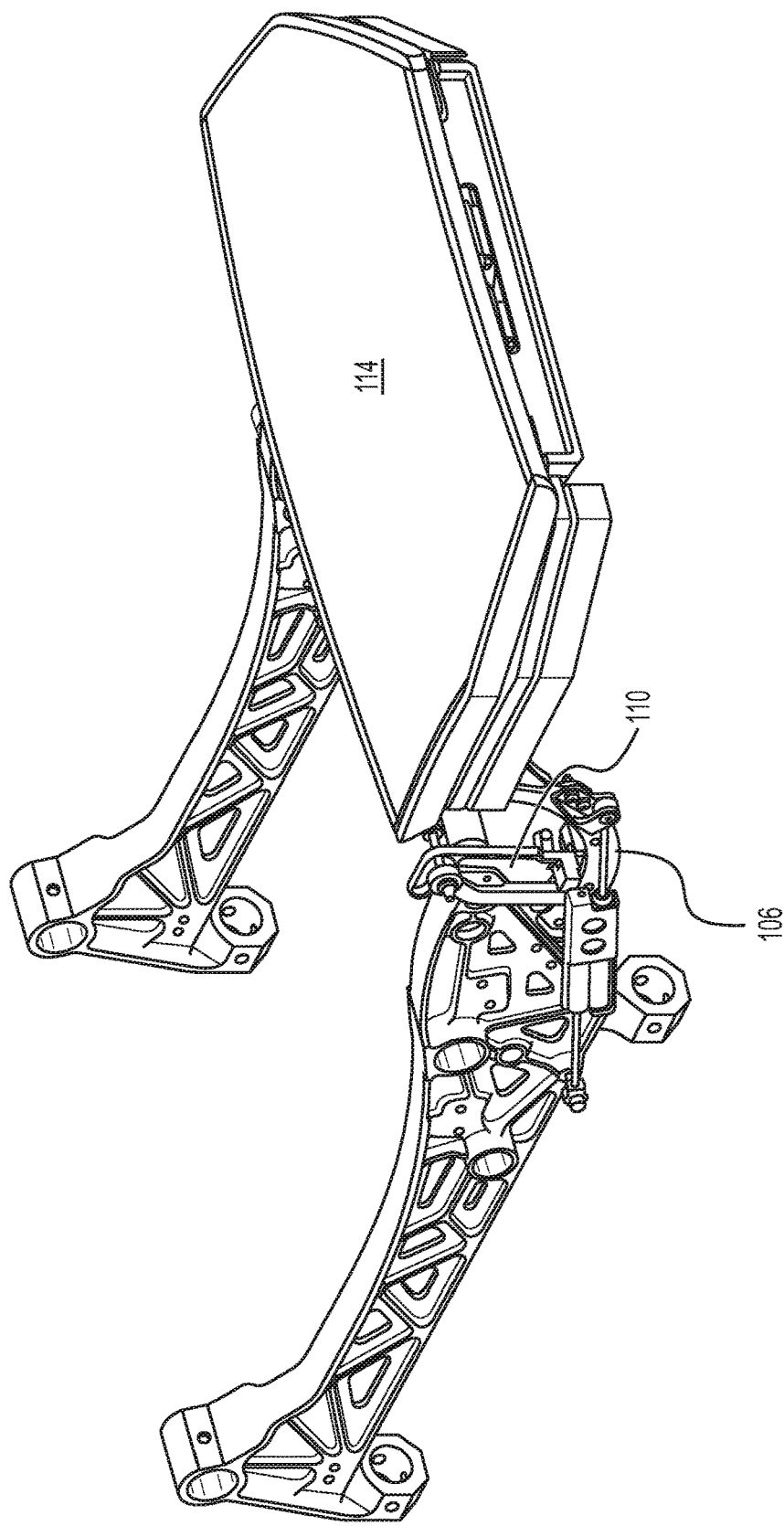
FIG. 1 is a perspective view showing a chair frame removed from a chair, which, in the disclosed embodiment, supports a footrest.
Figure 6:
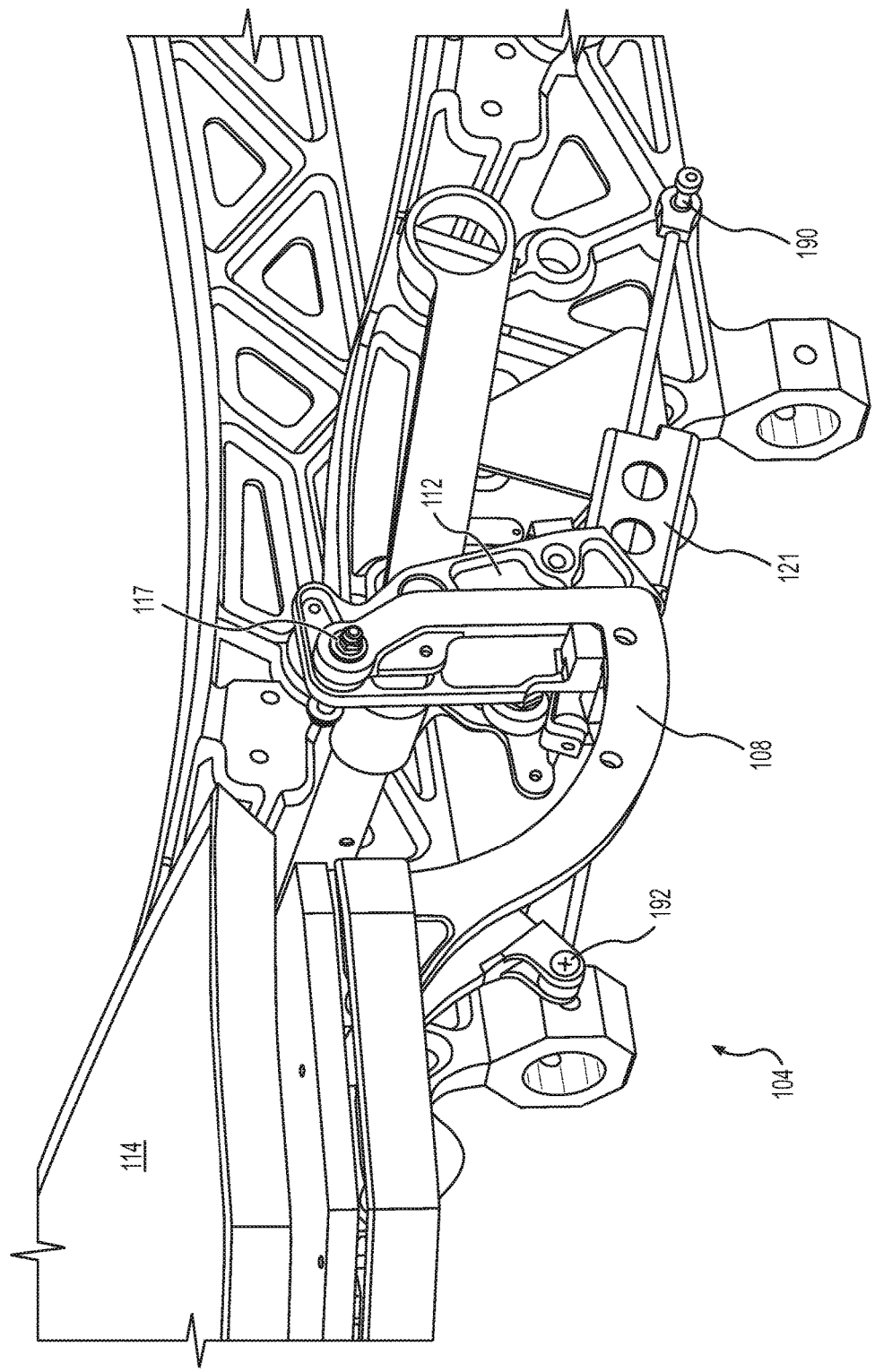
FIG. 6 shows a view of the footrest system from the opposite side shown in FIGS. 2A-C.
Figure 10:
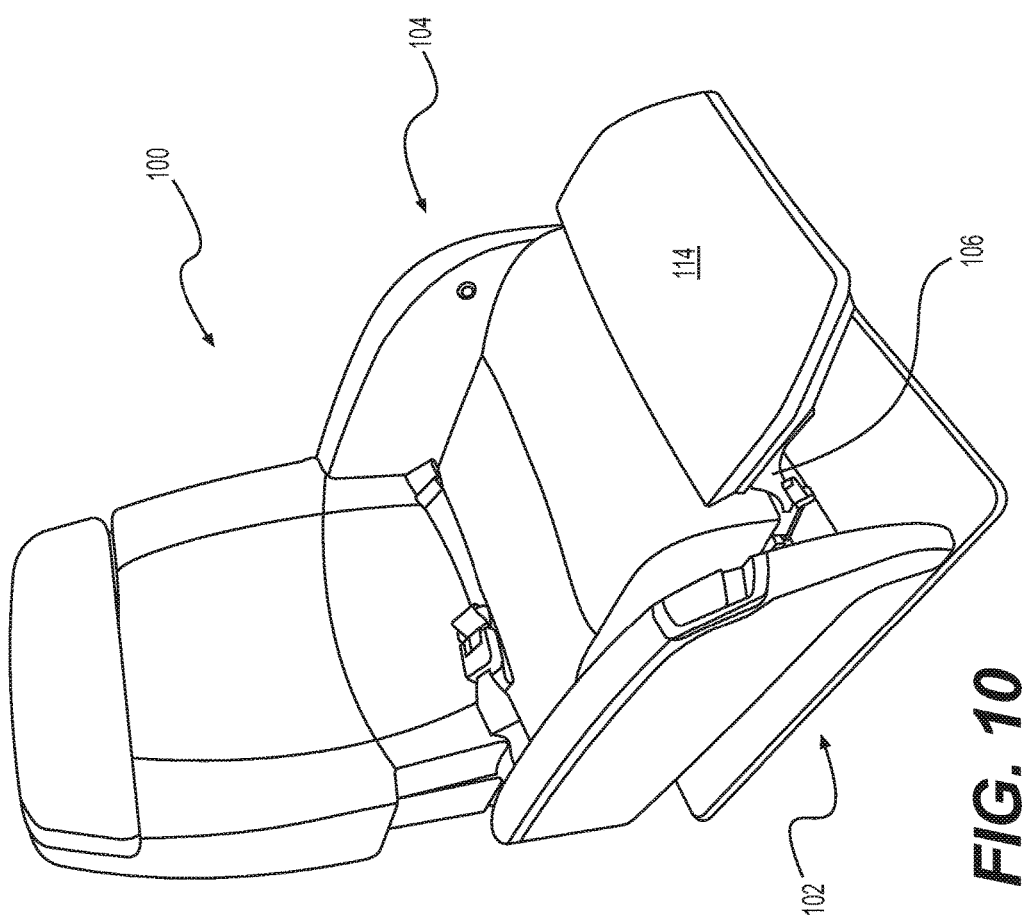
FIG. 10 shows the footrest overload protection system incorporated into a seat.

A chair 100 has two lateral sides, a first side 102 (see FIG. 10; see also FIGS. 1, and 2A-C), and a second side 104 (See FIGS. 6 and 10). Each of sides 102 and 104 includes a pivotal support member (members 106 and 108) which rotate in substantially parallel planes relative to each side. Support members 106 and 108 are fixed on each side to frame members 110 and 112, respectively, and securely support a footrest cushion member 114 (See FIG. 1) therebetween.

Figure 2A:
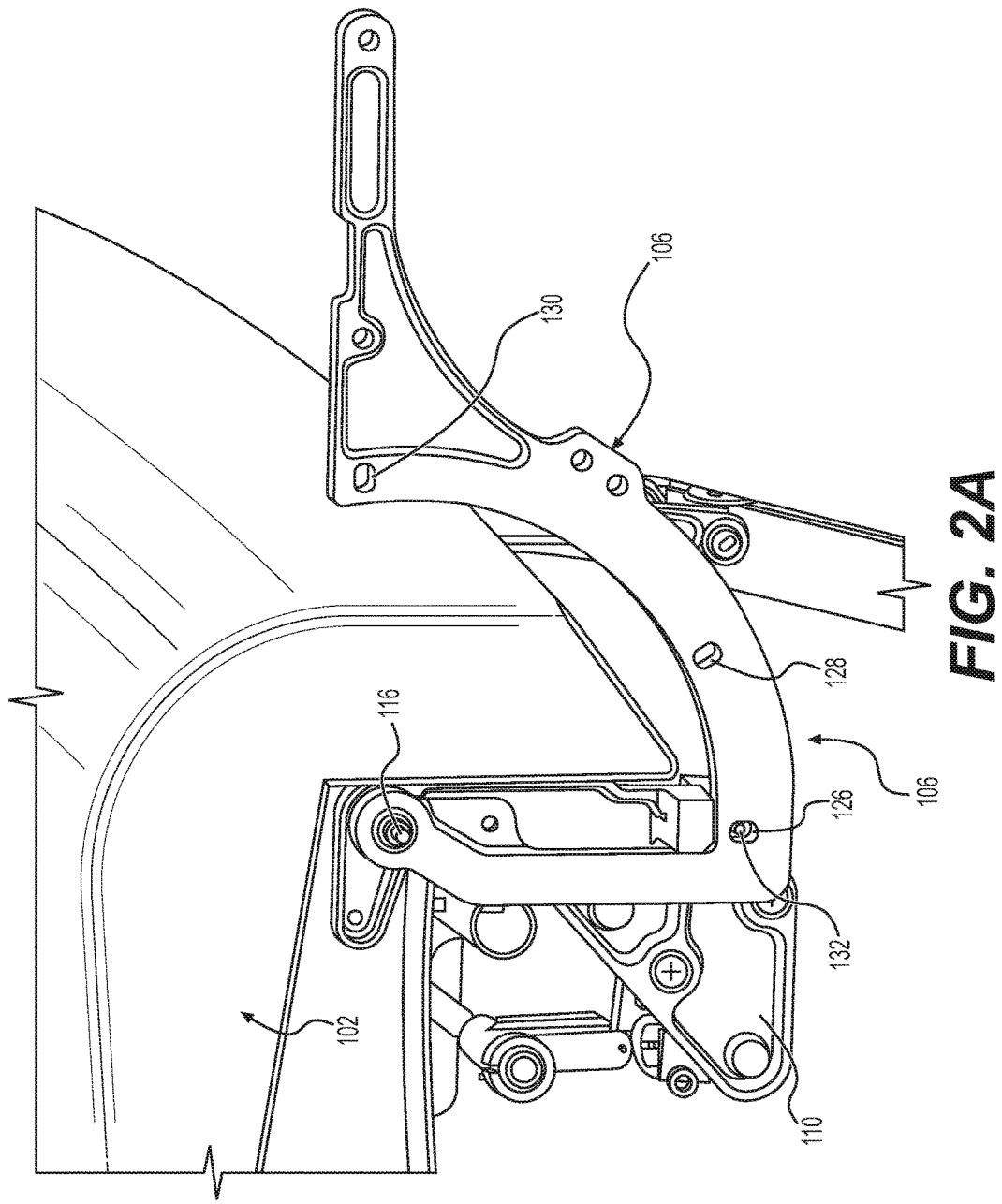
Figure 2B:
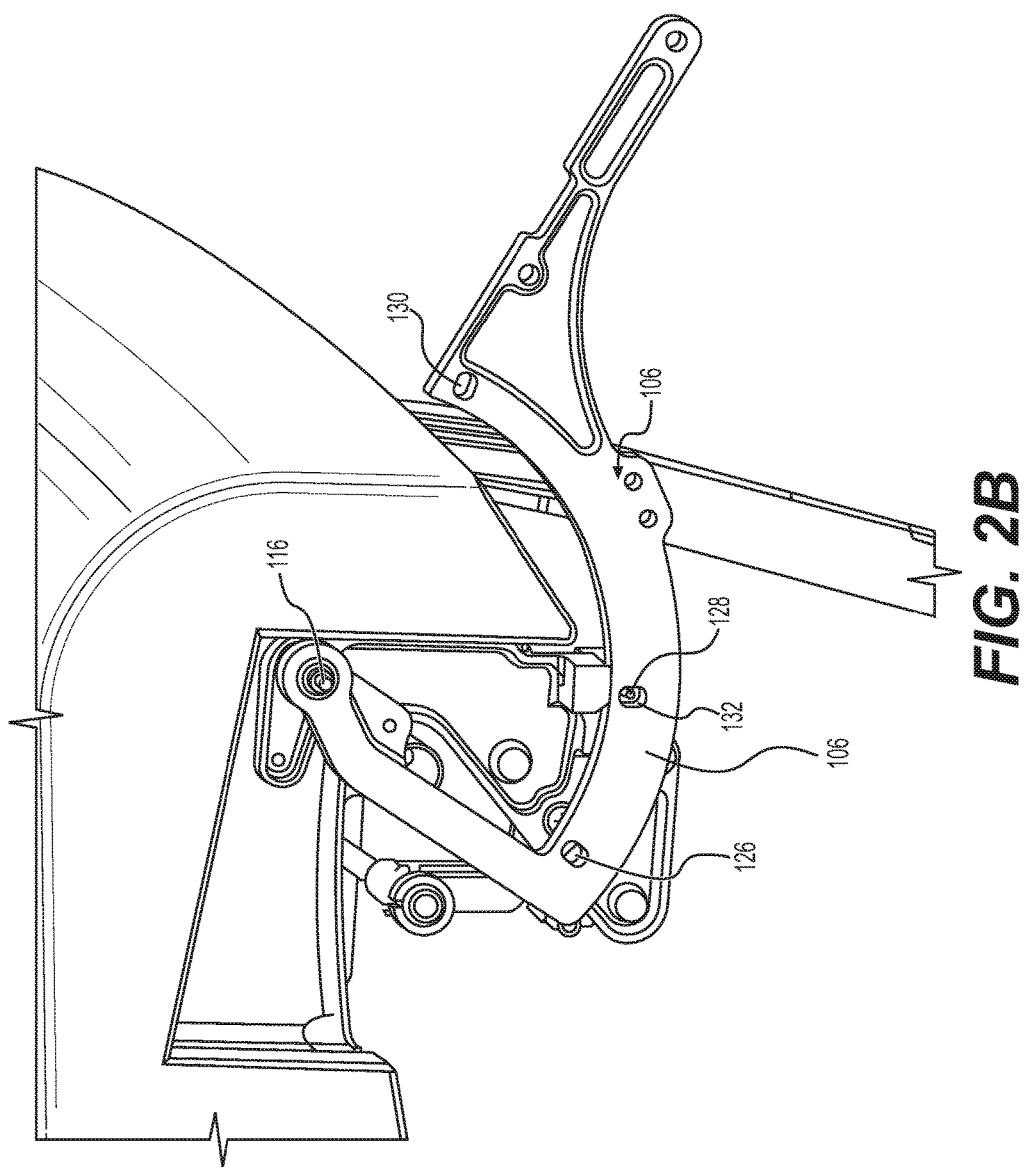
Figure 7:
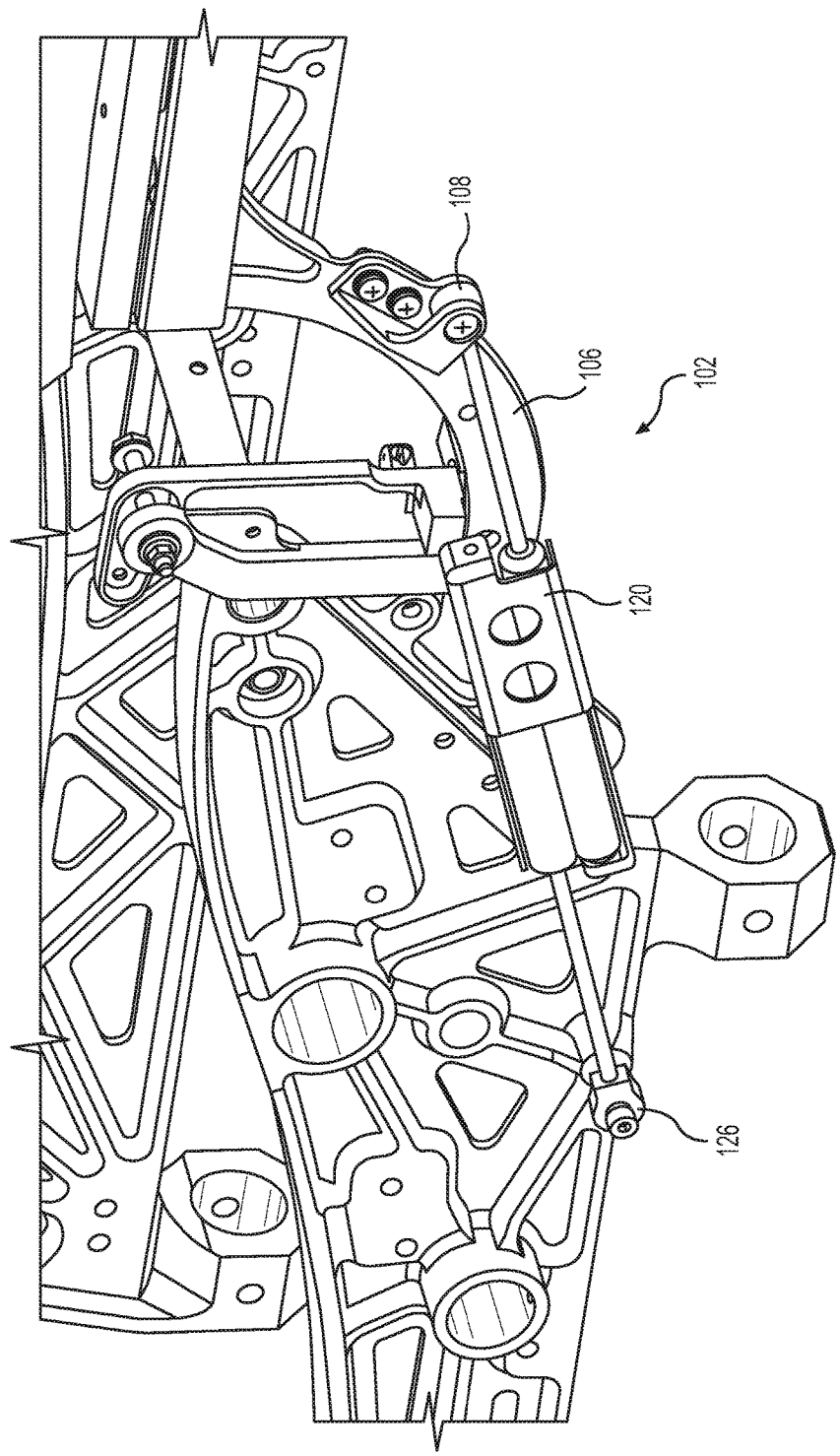
FIG. 7 shows a gas spring assembly which was removed in FIGS. 2A-C for the purpose of revealing features.

As can be seen in FIGS. 2A-C, support member 106 is pivotally attached to a pivot point 116 existing on a frame member 110 on the first side 102 of the seat. On an opposite side shown in FIG. 6, second support member 108 is pivotally attached to a pivot point 117 existing on the second frame member 112 on the second side 104 of the seat. Support members 106 and 108 are connected by the footrest structure 114 on the opposite ends, and thus, rotate in concert with one another. A first gas spring member 120 (see FIG. 7) on first side 102 of a seat is pivotally connected to a point 186 on the seat, and at an opposite end at a point 188 on the support 106. On an opposite side (see FIG. 6), a second gas spring member 121 on second side 104 of a seat is pivotally connected to a point 190 on the seat, and at an opposite end at a point 192 on the support 108. Gas springs 120 and 121 impart outward rotation (out and up) to footrest 114. Thus, unless acted on by a contrary force, the footrest 114 will tend to be in a deployed position shown in FIG. 1.

It should be noted that the chair 100 includes arrangements for the breakover pin system on both of sides 102 and 104 that are very similar in configuration as well as in function. Thus, as FIGS. 2A-C, 3A-E, and 4A-D are discussed, it should be understood that most of the same arrangements would be in existence on the other side (shown in FIG. 6). The two opposite systems (on sides 102 and 104) are operating dually.

When a user is sitting in the chair 100, they can release the footrest by releasing pins on either side of the chair using a handle. At the same time, while the pins are still released, the user can put their legs on top of the footrest 114 and push down. They can draw the footrest down into a desirable position by overcoming the force imported by the gas springs 120 and 121 which push up from below the footrest 114. When this is done, a retractable pin arrangement 122 can be used to position the footrest 114 in a plurality of angular positions. When the handle is then released, the pins can re-engage in a variety of positions.

In the disclosed embodiment, three positions are enabled using a plurality of radially-clocked apertures, 126, 128, and 130 (as shown on first side 102). Each aperture is adapted to receive the outwardly extending portion 132 of the pin member 124, and each pin location designates a different level of angular extension of the footrest 114 relative to the front of the chair. Each of FIGS. 2A, 2B, and 2C show the frame member with the footrest cushion and other features removed. When the pin 124 is received in a first aperture 126, the footrest is locked into the fully extended position shown in FIG. 2A. When the pin is received into a second, intermediate, aperture 128, the footrest is locked into the extended position shown in FIG. 2B. Finally, when the pin is received into a third aperture 130, and the footrest is fully retracted as shown in FIG. 2C.

The position shown in FIG. 2A, where the footrest is fully extended, would be used where the user desires their legs to be propped up completely. The intermediate position, shown in FIG. 2B, would be used where the user desires only a little bit of propping up of their legs. A third position shown in FIG. 2C, is for when the passenger does not want any support and instead wants the footrest to be fully retracted.

Figure 3B:
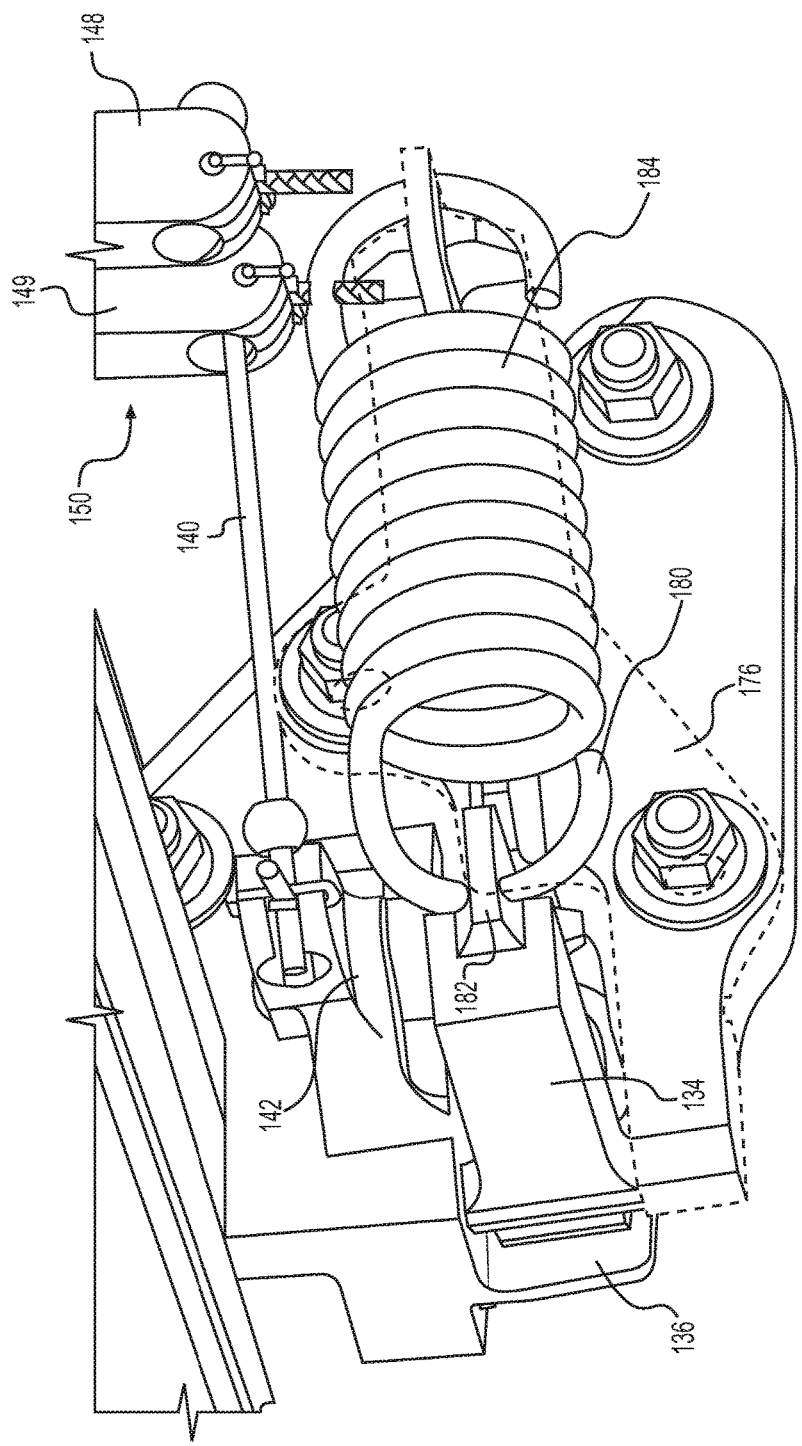
Figure 3C:
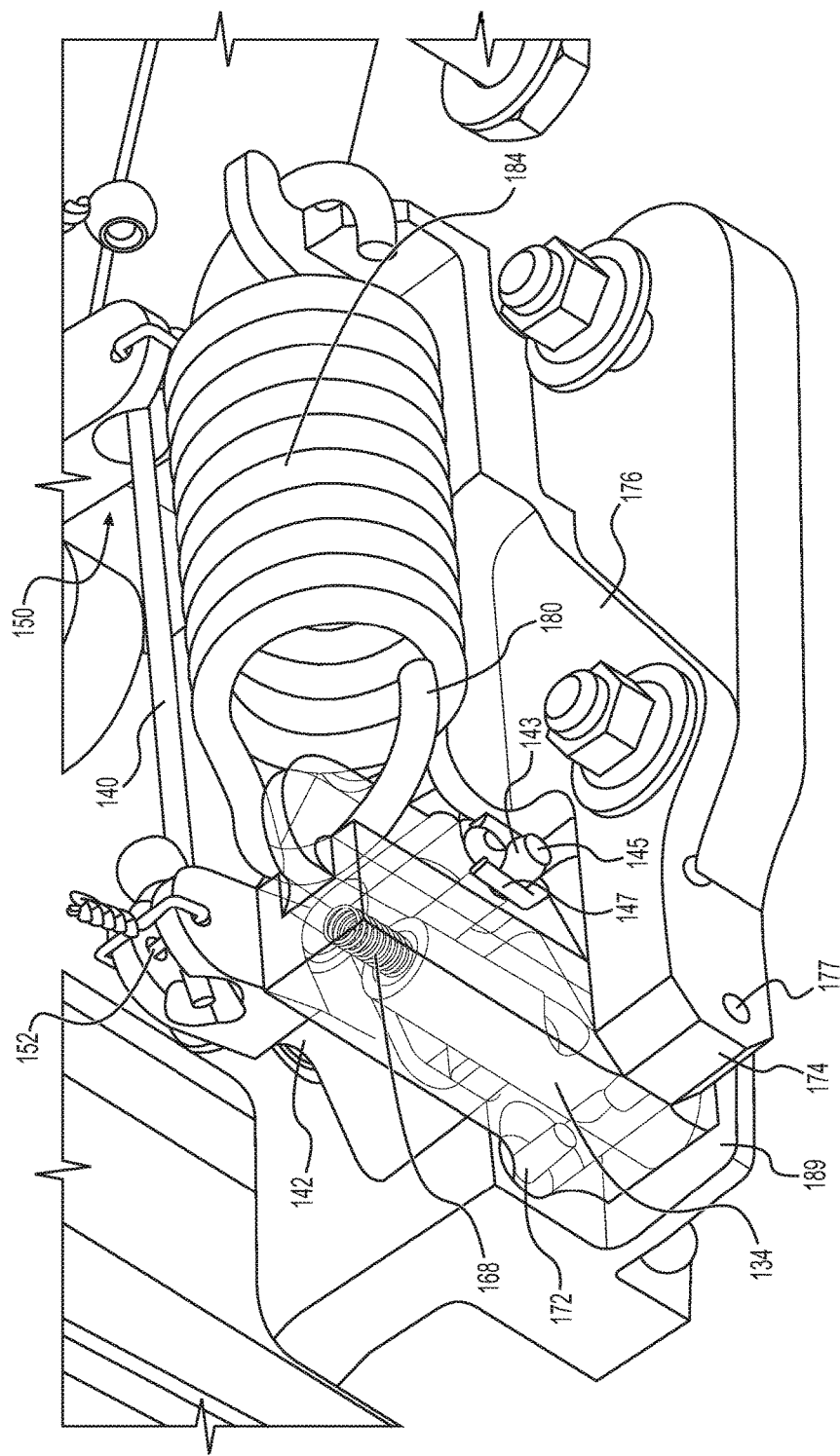
Figure 3E:
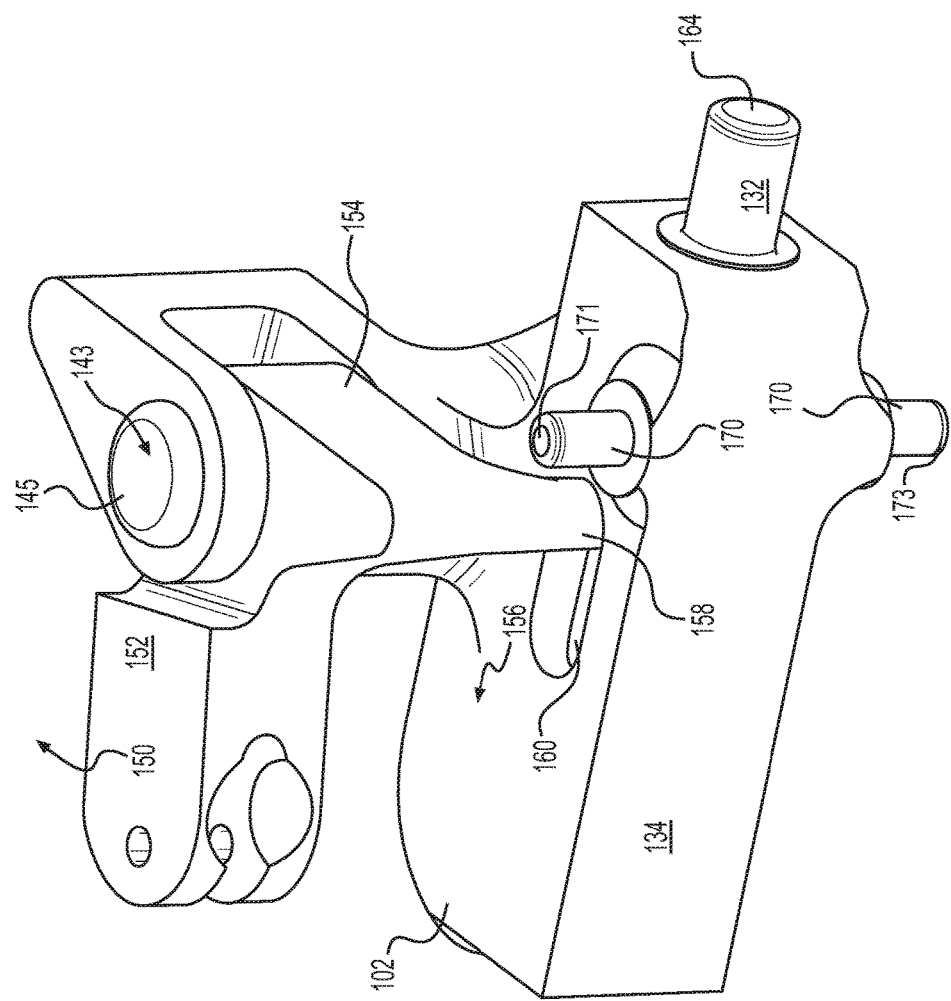

Referring now to FIGS. 3A-3E, the details regarding retractable pin arrangement can be seen. As can be seen in FIGS. 3D and 3E, the pin member 124 is included inside a pin housing 134. The housing 134 is positioned behind a flange 136 formed as a part of the frame member 110. (See FIG. 3B). The outwardly extending portion 132 of pin 124 is received through a laterally elongated aperture 138 formed in the flange 136.

During normal operation, the pin member is made to be retractable into and out of the housing by a wire 140 that is used to activate a rocker mechanism 142. The rocker mechanism 142 pivots on a through pin 143 having a head 144 (which can be seen in FIG. 3E) and an end 145 (which is seen in FIG. 3C). The pin is secured using a cotter pin 147 that passes through a transverse bore (not shown) made axially through end 145 to (along with containing head 144) retain the pin in a known manner. Pin 143 acts as a rotational axis for the rocker 142. Rotation of the pin housing 134 is prevented against rotation in the direction of a spring 184 by contact made between an engagement face 183 (FIG. 3A) with a surface 189 (FIG. 3C) of frame member 110.

Figure 8:
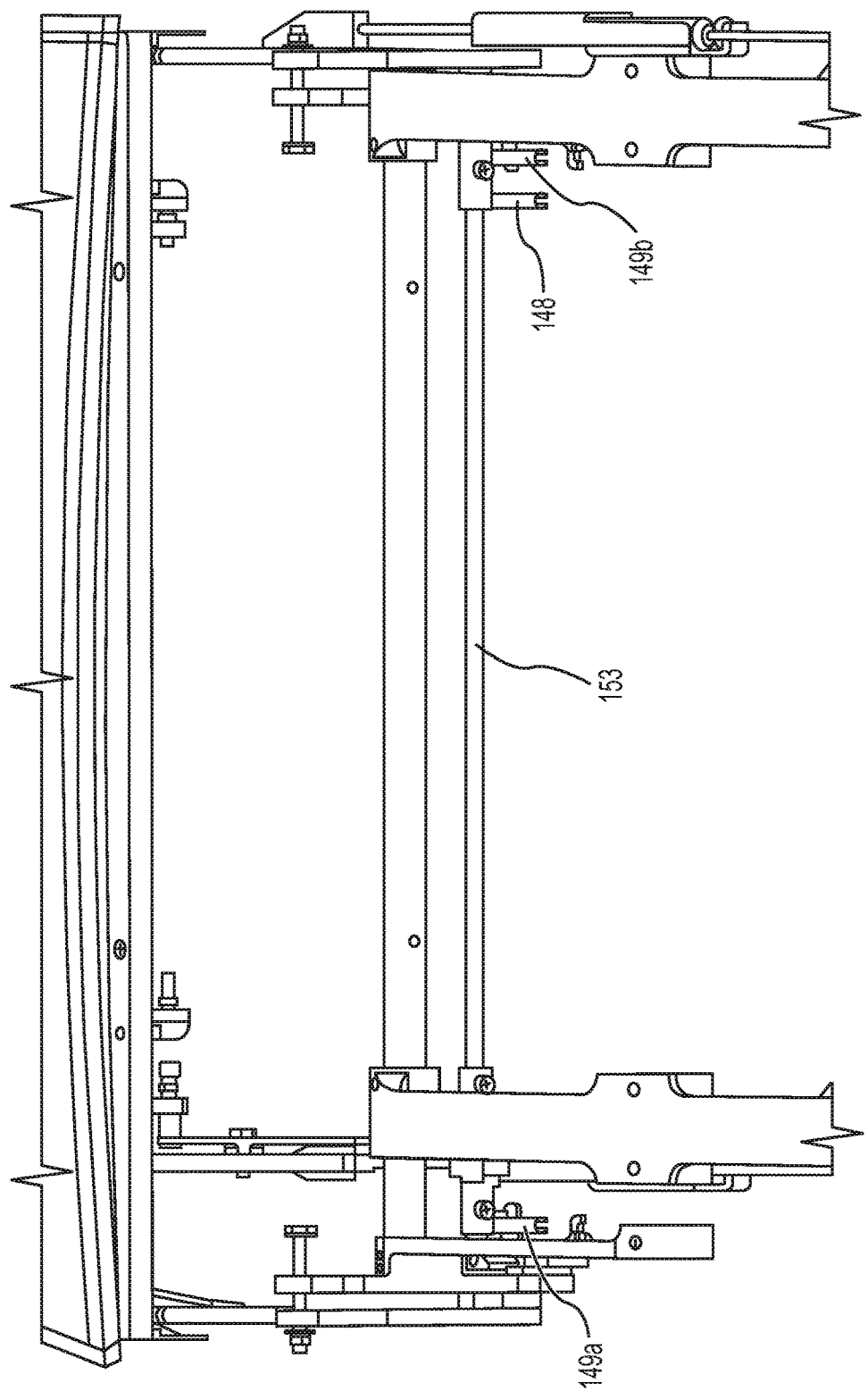
FIG. 8 shows an actuator arrangement including a rotatable bar that receives tension from a cable to administer release of the pin to release the footrest.
Figure 9A:
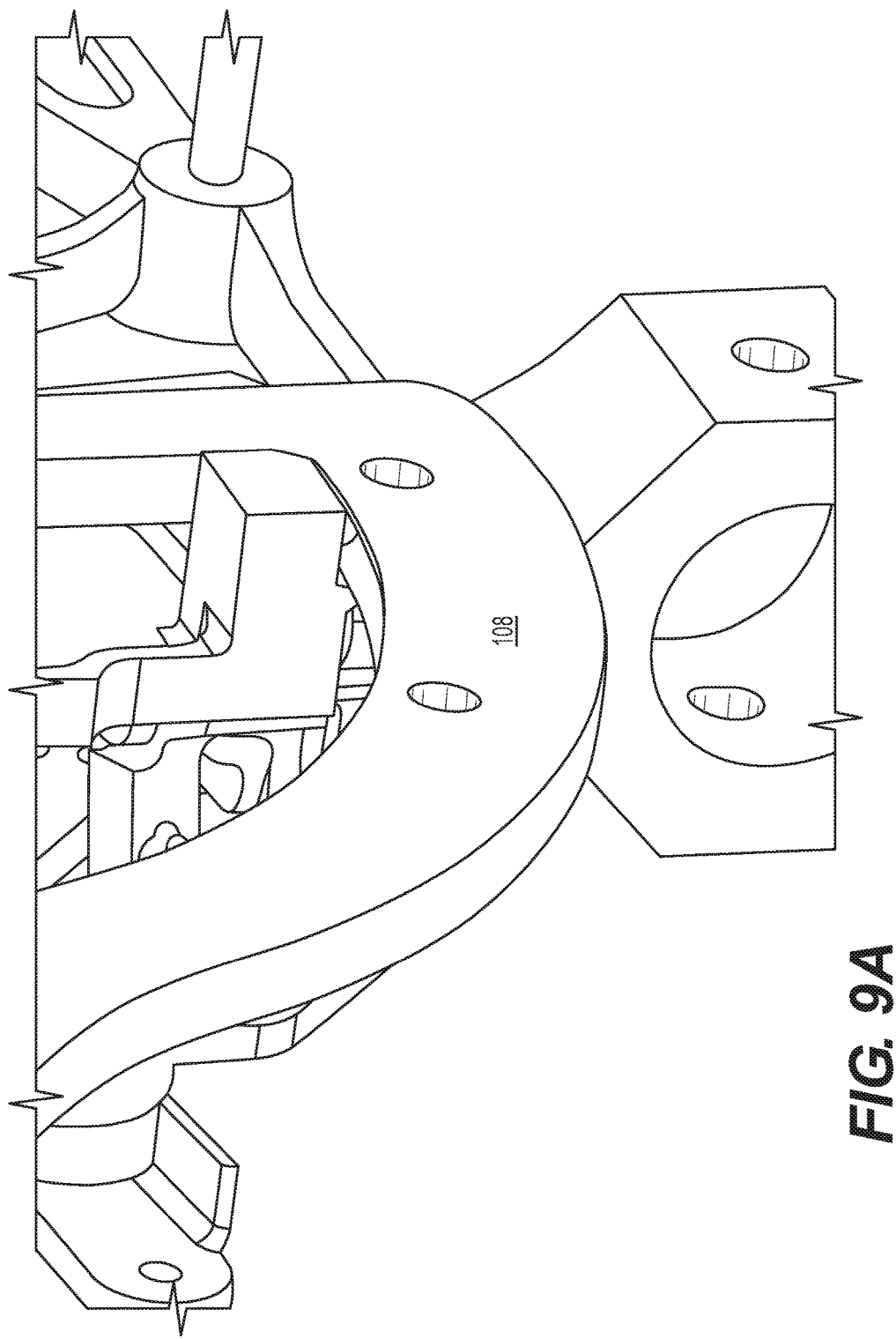
FIGS. 9A-D show views of the substantially similar pin release system on the other side 104 of the footrest.
Figure 9B:
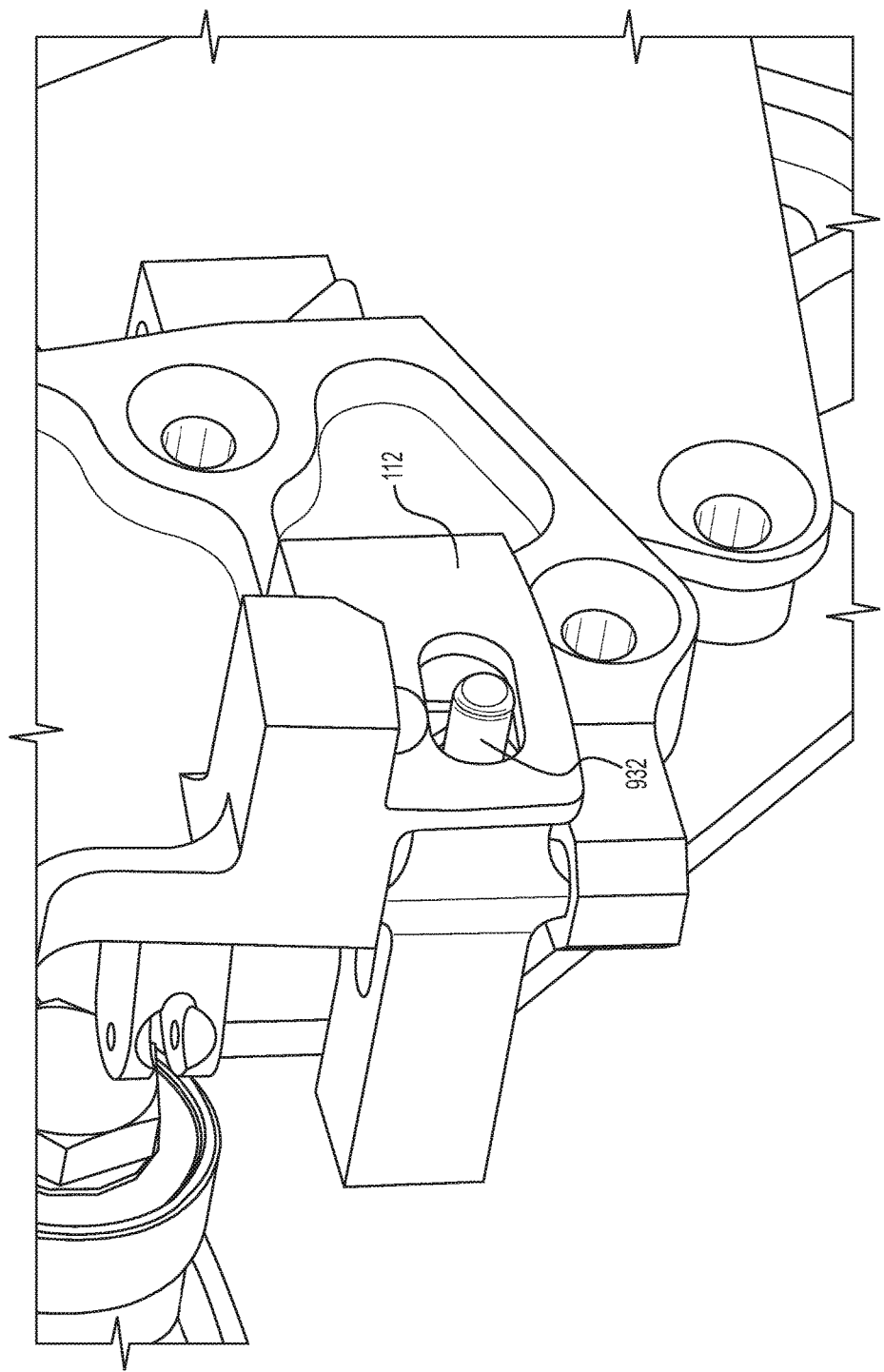
Figure 9C:
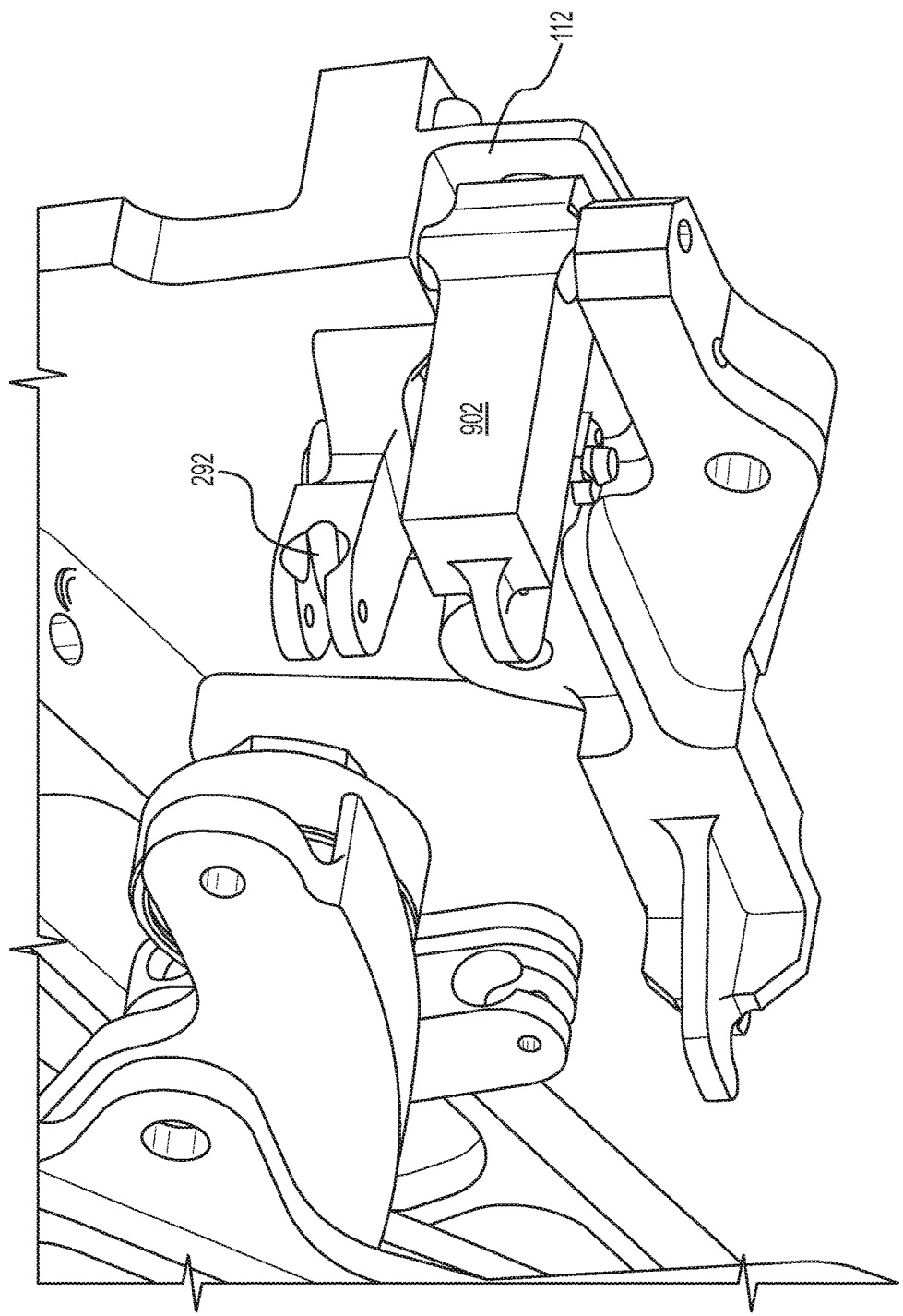
Figure 9D:
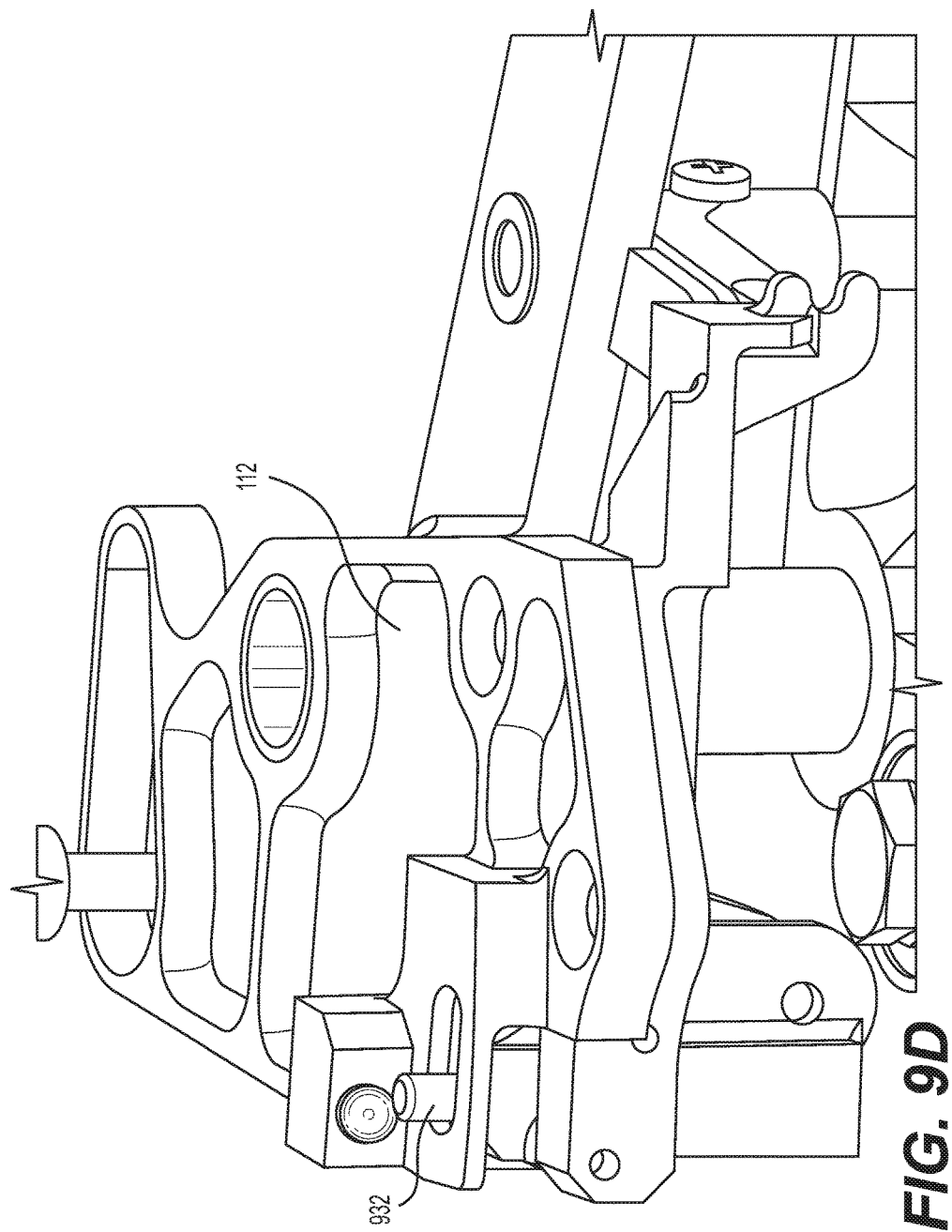

During an intended pin retraction initiated by lifting a handle activated by a user (not shown), a head 149 (see FIG. 3B) will rotate in a direction resulting from tension imparted into cable 140 by a rotating rod 153. As can best be seen in FIG. 8, rod 153 is used to drive not only head 149a, but also head 149b which is used to retract a pin on the opposite side 104 of the chair. The upward pulling of heads 149a and 149b by the rotation created into rod 153 by the pulling upward by a cable (not shown) that is retracted by the handle in a known manner creates pin retractions on both sides of the chair. Thus, this is one feature which is not duplicated on the other side of the chair (not symmetrical). Instead, the opposite side 104 (see FIG. 6) of the seat has another rocker arrangement like rocker 142 in FIG. 3B. And the rocker arrangement on side 104 is also actuated in the same manner (by another cable like cable 140, but the one on side 104 is actuated by a cable attached to head 149b). Thus, the single handle can be used to retract the pin arrangements on both sides to release the footrest and put the footrest into one of a plurality of positions (three in the embodiment disclosed).

Figure 5C:
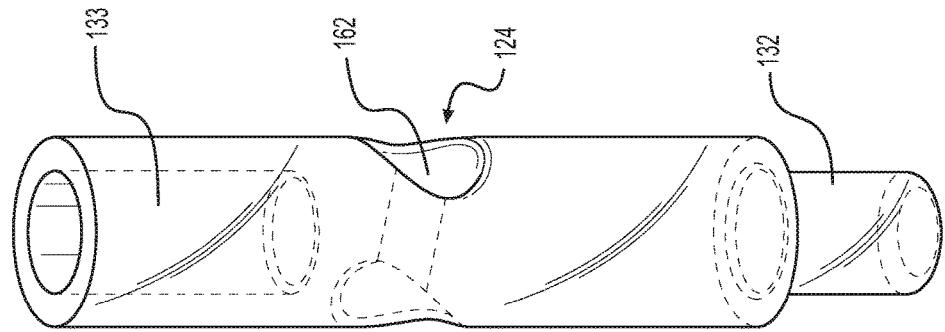
FIGS. 5A-C show a release-pin member utilized in embodiments disclosed.
Figure 5B:
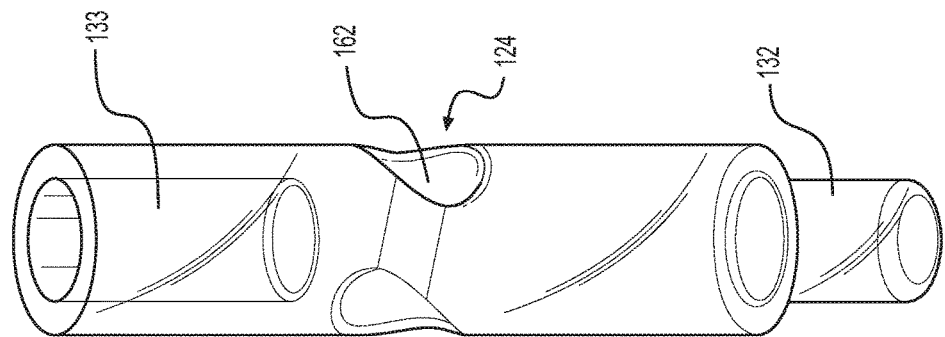
Figure 5A:
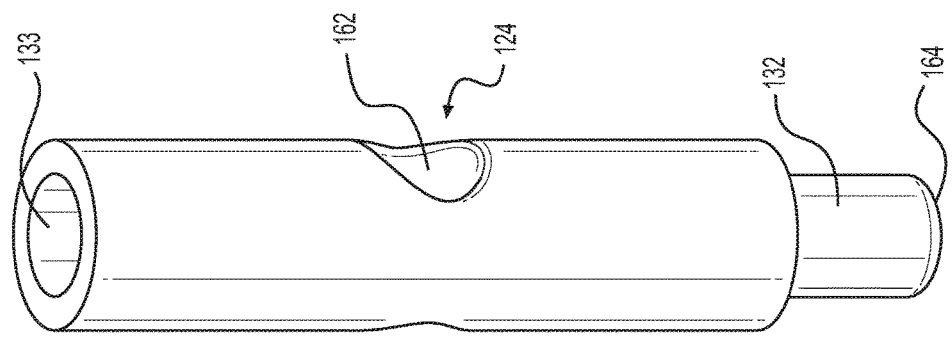

Looking back to side 102 specifically, the pulling of rocker head 152 in direction 150 results in the consequential rotation (in a direction 156) of a leg 154 of the rocker. An elongated transversely extending peg 158 moves in a slot 160 made through the side of the pin housing 134, and then extends into a transverse bore 162 made through the middle of the pin member 124. When this occurs, the pin 124, which in ordinary state is compelled outward by a compression spring 168 contained in the housing such that an outer tip 164 of the pin head 132 normally extends out into the position shown in FIGS. 3A, 3D, and 3E. But upon the pulling of cable 140, the spring forces are overcome, and the pin is retracted (further compressing spring 168 which is received into axial bore 133 as seen in FIGS. 5A-C) to the extent that the tip 164 of the pin head 132 (see FIG. 3D) reaches the inside surface 166 of the particular aperture (e.g., one of apertures 126, 128, 130 made through pivotal support 106, as well as three symmetrical apertures in the pivotal support on the other side). Once this occurs, both pivotal support members 106 and 108 become unhitched, and the user is able to adjust to another setting (e.g., cause the pin head to rest in another of apertures 126, 128, 130 and other symmetrical apertures on the other side) by administering leg pressure on the top of the footrest, which is still subject to the upward bias created by the gas springs 120. If the user has stopped pressing the release button on the seat, the spring bias (provided by pin spring 168) will cause the pin head 132 to snap into the first aperture that is encountered, thus, locking the footrest in a new position.

A breakover system is also provided. More specifically, a break-over pivotal axis for the pin housing 134 is created by putting the housing on an axle 170. A first end 171 of axle 170 is received into a receptacle 172 formed into a portion of frame 110. A second end of the axle 173 is received into a receptacle formed from an axial bore 177 made through a portion 174 of a spring supporting structural member 176, all of which are fixed to the housing.

The spring supporting structural member 176 is provided on one end with a spring supporting hook 180. This hook, along with hole made through a flange 182 on the pin housing 134, enable a tension spring 184 to be stretched and secured there between. This pulls the flange end 184 in the direction of the spring, thus, firmly holding the engaging face of the pin housing 134 against the frame member 110 to inhibit motion.

The pin housing will remain secure in the positions shown in FIGS. 3A-D unless an abnormal amount of force is put down onto the footrest in a manner that would potentially cause structural damage to the mechanical components. For example, if a person stands on the footrest in order to reach an overhead bay, the weight could cause damage. In order to prevent this, the tension spring 184 is selected to be rated such that it will only be moved in the event that a predetermined force, e.g., an amount less than what will cause damage, is reached. When, however, an overcoming force is reached, the entire pin housing will begin to rotate about the break-over axle 170. FIGS. 4A-E show how the pin housing and other related equipment behave in a break-over due to excessive force being applied downwardly onto the footrest. Each figure shows a different stage in a break-over disconnect.

Figure 4A:
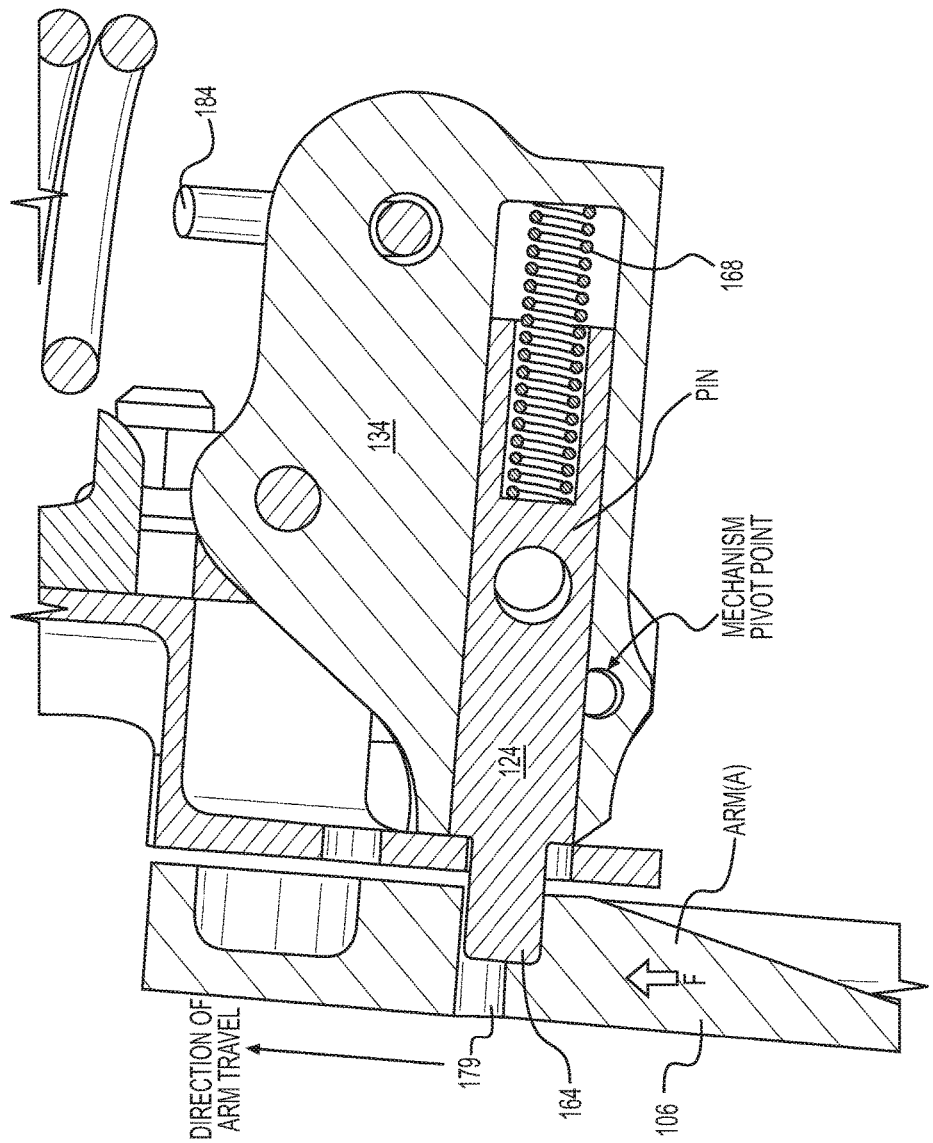
FIGS. 4A-D show the pin release system in various stages during a breakover.
Figure 4B:
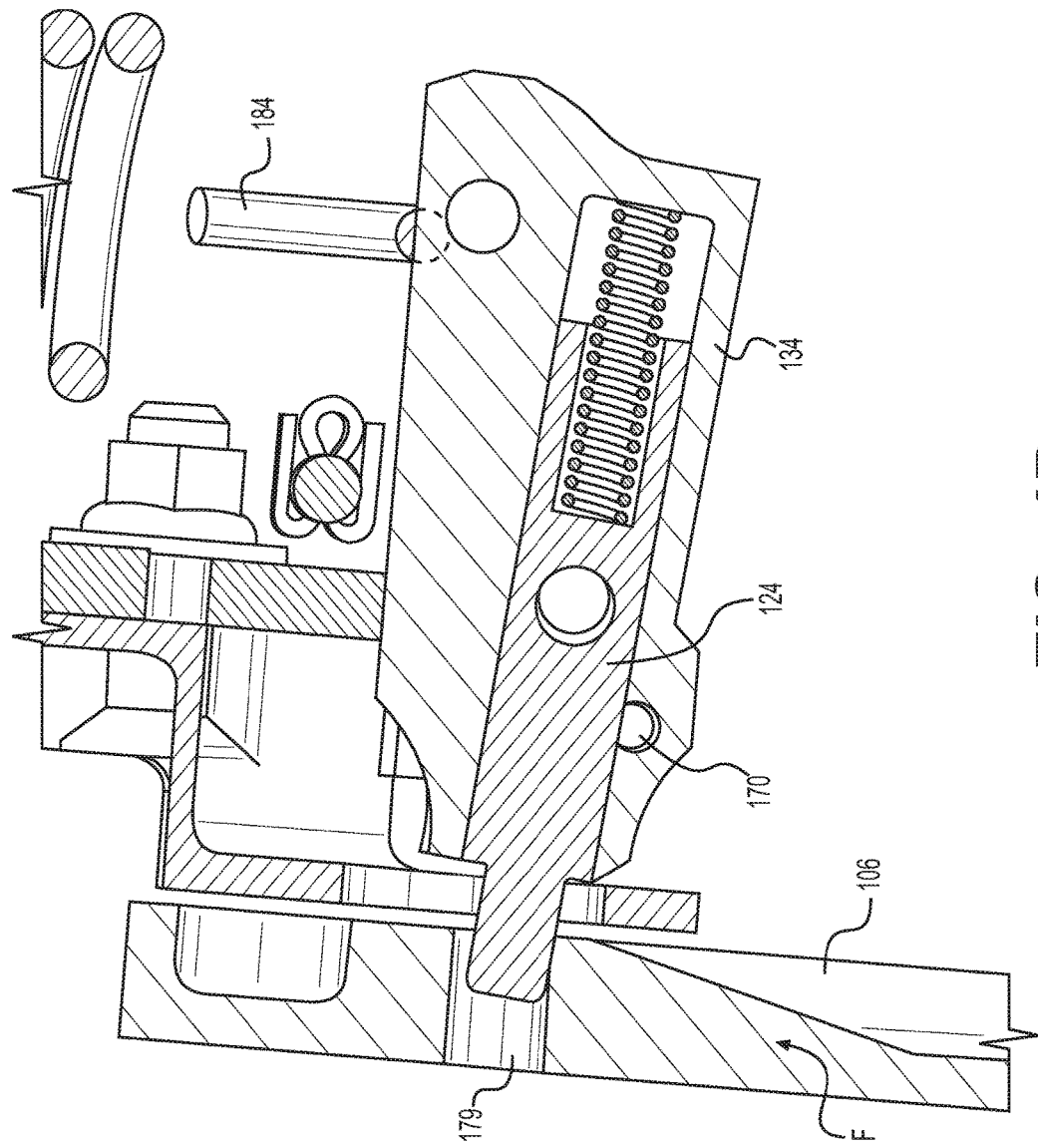
Figure 4C:
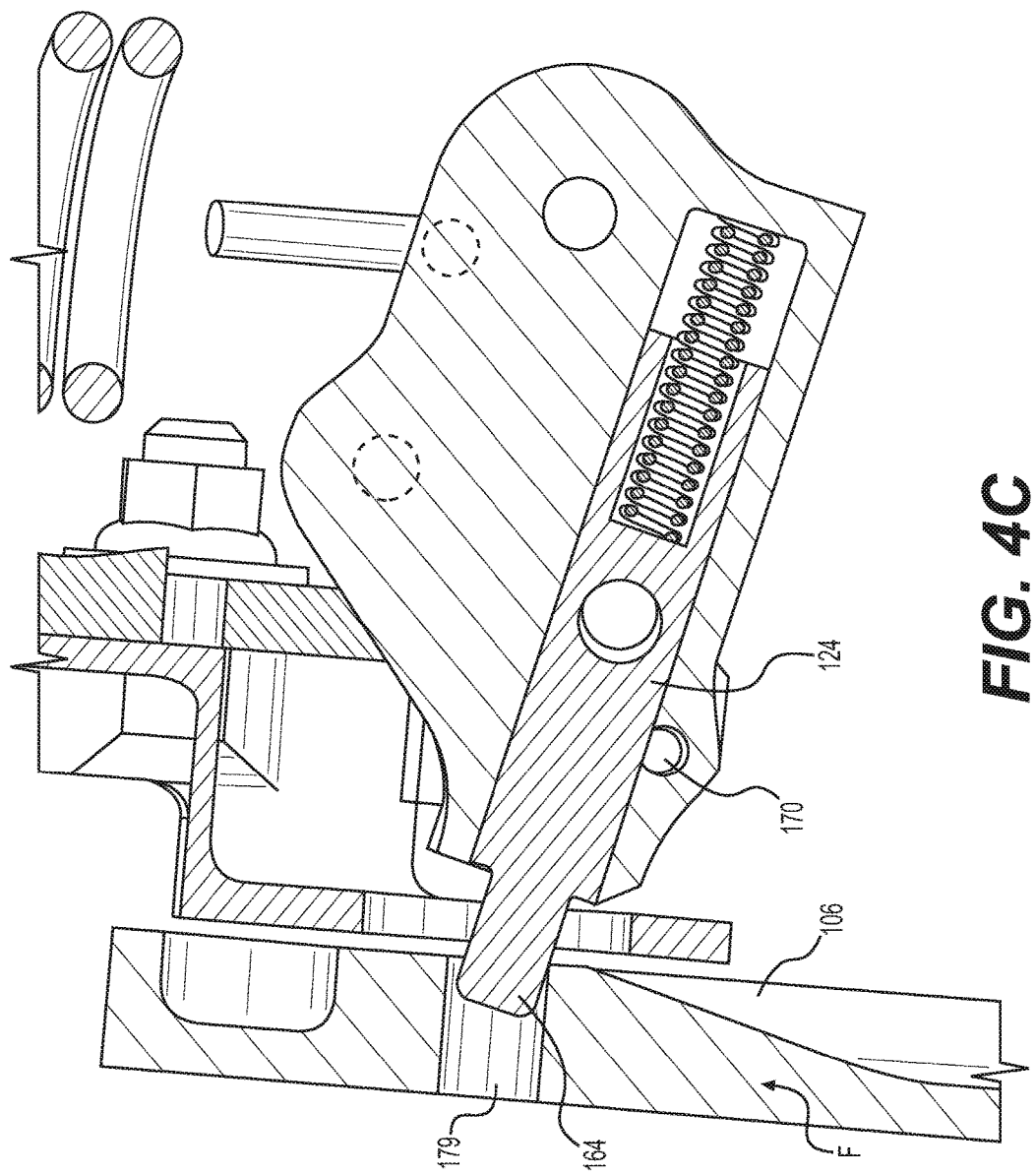
Figure 4D:
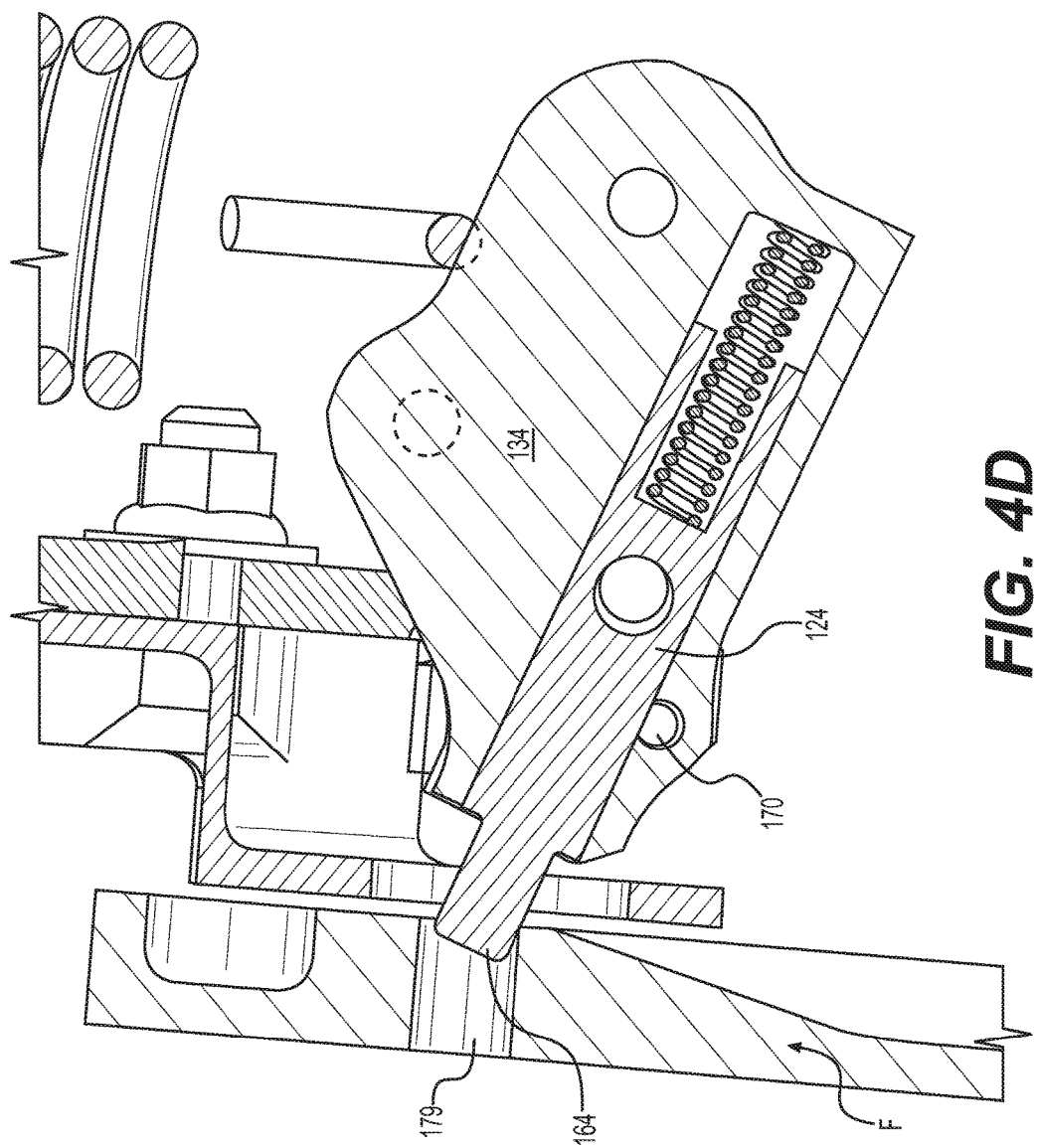

In FIG. 4A, a force (F) is applied in the direction shown due to the load on the footrest, and thus, the pivotal support member 106. The force however has not reached a stage where a break-over will occur. Thus, the pin housing is still in an original position, being held securely in place by the force provided by spring 184, and the tip 164 of the pin 124 is still well within the aperture 179. It should be noted that aperture 179 could, by representation be any of apertures 126, 128, or 130 discussed already above. In FIG. 4B, the force has reached a point at which it has overcome the force imparted by spring 184. Therefore, the pin housing 134 has started to move clockwise about axle 170. In FIG. 4C, the force has been sufficient to rotate the pin housing to an extent that the angular rotation from the normal is pronounced, and the pin head 164 has begun to move out of the aperture 179. In FIG. 4D, the pin housing 134 has rotated to an extent that the pin head 164 has come completely out of the aperture 179. When this occurs there is a release of the force being imparted into the support 106, because it moves freely, being removed from the formerly securing aperture 179. Because the spring tension and axial dimensions have been designed to create the release shown in FIG. 4D at a predetermined maximum force, any structural damage to the mechanical parts will be avoided.

It should be noted, that a second dually acting breakover system, like the one shown in FIGS. 1, 2A-C, and 3A-E is provided on the symmetrical second side 104 as can be seen in FIGS. 9A-D. This second, substantially similar breakover system cooperates on the other side of the footrest and has a pin included in a housing 902 on a pivot, the pin has an exposed head 932 which extends through a slot made in frame 112 (see FIG. 9D) and is normally retractable upon the pulling of the handle which tensions a cable (not shown) received into a rocker head 292. Like has already been described regarding the other side of the footrest, a breakover will occur simultaneously on this side as well when a force on the footrest (weight-supporting member) is too great. Upon the introduction of unacceptable weight, the pins on both sides will break out of the apertures on both sides such that the weight-supporting member is released.

In embodiments, the pin on the symmetrical other side 104 will have a spring that is rated the same as spring 184 to balance the system out laterally. Thus, the two springs will be collectively rated to prevent damage by releasing the symmetrical pin arrangements on each side of the device.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for use with a chair, the chair having a footrest, the system comprising:
   a chair frame supporting a release pin assembly;
   a footrest supported on a front portion of the chair frame, the footrest being supported by at least one pivotal member;
   the pivotal member having a plurality of angularly spaced apart apertures made there through, each of said apertures adapted to receive a release pin, each of said apertures further serving to, when the pin is disposed therein, to position the footrest in a first respective angular position, the release pin being adapted to be retractable to enable removal from one of said apertures to allow for rotation of the pivotal member from the first position to snap the release pin into another of said apertures and thus putting the footrest into a second angular position;

the release pin being included in a housing, the housing being subject to a break-over pivot;

a first resistance system providing resistance against rotation of the pin, and configured to allow the pin to break out of an aperture in the plurality into which the pin is secured when a predetermined load maximum has been reached to prevent overloading of the pivotal member.

2. The system of claim 1 wherein the break-over pivot is created on an axle.

3. The system of claim 2 wherein one end of the axle is received into a first receptacle on the frame, and a second end of the axle is received into a second receptacle on the frame.

4. The system of claim 2 wherein the pin is spring-loaded within the housing.

5. The system of claim 2 wherein the resistance system includes a tension spring a first end of which is secured to the frame and a second end of which is stretched and secured to a back end of the housing.

6. The system of claim 5 wherein the tension spring causes a portion of a front end of the housing to bear against an engaging face on the frame unless a force existing in the pivotal member exceeds the predetermined maximum.

7. The system of claim 6 wherein the resistance system is configured, upon an overcoming force being reached, to allow the pin housing to rotate about the axle thus causing the front of the pin housing to lift off of the engaging face on the frame and release the pin.

8. The system of claim 1 including a symmetrical arrangement on an opposite side of the chair.

9. The system of claim 8 wherein the symmetrical arrangement includes a second resistance system which has a resistance to rotation equal to the resistance to rotation executed by the first resistance system.

10. The breakover system of claim 2 wherein the resistance system incorporates a spring which has been rated to allow for a release of the pin upon the reaching of the predetermined load maximum.

11. A system for supporting a footrest, system incorporating two breakover systems like the one described in claim 2 above, each of the two breakover systems being located on opposite sides of the footrest.

12. The system of claim 4 wherein each of the two breakover systems includes a spring which is rated to allow for release to prevent damage.

13. A breakover system for preventing structural damage to at least one mechanical component, the breakover system comprising:

a pin on a frame;

a weight-supporting member including at least one aperture, the aperture upon receipt of the pin, causing the member to be in a first position;

an overload-prevention system, the overload-prevention including a housing for the pin, the housing being subject to a pivot, and a resistance system providing resistance against rotation of the housing unless a predetermined load maximum has been reached;

the overload prevention system, once the load maximum has been reached, enabling rotation of the pin housing in a direction such that the pin breaks out of the aperture such that the weight-supporting member is released.

14. A method for preventing structural damage to a passenger-supporting device in an aircraft, the method comprising:

providing a release pin in a system in the aircraft, the release pin being removable from an aperture in an arm mounted on a frame to allow for relative motion between the frame and arm, the arm being one of translatable or pivotal relative to the frame;

including the release pin in a housing;

making the housing pivotable relative an axle secured at both ends to the frame;

providing resistance against rotation of the pin about the axis;

establishing the resistance at a level allowing the pin to break out of an aperture when a predetermined load maximum has been reached to prevent overloading of the arm.

15. The method of claim 14 comprising:

including using a torsional force to execute the providing resistance step.

16. The method of claim 15 comprising:

configuring the pivotal housing relative to the frame such that a portion of a front end of the housing bears against an engaging face on the frame unless a force existing in the member exceeds the predetermined maximum.

* * * * *